United States Patent
Tan et al.

(10) Patent No.: US 6,920,253 B2
(45) Date of Patent: Jul. 19, 2005

(54) OPTICAL MODULATOR BASED ON A MICRODISK RESONATOR

(75) Inventors: Michael R. Tan, Menlo Park, CA (US); Scott W. Corzine, Sunnyvale, CA (US); Mihail Sigalas, Santa Clara, CA (US); Chaokun Lin, Fremont, CA (US); Kostadin Djordjev, Cupertino, CA (US)

(73) Assignee: Agilent Technologies, Inc, Palo Alto, CA (US)

( * ) Notice: Subject to any disclaimer, the term of this patent is extended or adjusted under 35 U.S.C. 154(b) by 0 days.

(21) Appl. No.: 10/678,887

(22) Filed: Oct. 2, 2003

(65) Prior Publication Data

US 2005/0074194 A1 Apr. 7, 2005

(51) Int. Cl.⁷ .............................. G02F 1/01; H04B 10/12
(52) U.S. Cl. .................. 385/1; 385/2; 385/42; 385/129; 385/130; 385/14; 385/27; 385/28; 359/341.1; 359/346; 359/347; 359/348; 359/349
(58) Field of Search ............................. 385/1, 2, 3, 14, 385/42, 129, 130, 131, 132, 27, 28; 359/346, 347, 348, 349, 341.1

(56) References Cited

U.S. PATENT DOCUMENTS

| | | | | |
|---|---|---|---|---|
| 6,633,696 B1 | * | 10/2003 | Vahala et al. | 385/27 |
| 2001/0004411 A1 | * | 6/2001 | Yariv | 385/28 |
| 2002/0041730 A1 | * | 4/2002 | Sercel et al. | 385/30 |
| 2002/0081055 A1 | * | 6/2002 | Painter et al. | 385/2 |
| 2004/0240782 A1 | * | 12/2004 | de Almeida et al. | 385/27 |

* cited by examiner

Primary Examiner—Brian M. Healy (57) ABSTRACT

A modulator having a waveguide and a microdisk resonator is disclosed. The waveguide has an input port for receiving a light signal of wavelength λ and an output port for transmitting modulated light. The microdisk resonator has a resonance at λ and is coupled to the waveguide between the input and output ports such that at least 10 percent of the light traveling in the waveguide is coupled to the microdisk resonator. The microdisk resonator further includes a material having a first state and a second state, the material absorbing more of the light in the first state than in the second state. The first and second states are selectable by a signal that is applied to the microdisk resonator. In one embodiment, the waveguide and the microdisk resonator occupy different portions of a sheet of material having the various layers used to construct the resonator.

8 Claims, 7 Drawing Sheets

OPTICAL MODULATOR BASED ON A MICRODISK RESONATOR

FIELD OF THE INVENTION

The present invention relates to light modulators.

BACKGROUND OF THE INVENTION

Communication systems based on modulated light sources are well known to the art. In high-speed communication systems, the light source is typically a laser. At frequencies below 10 GHz, the modulation can be imparted to the light source by turning the laser current on and off. Unfortunately, this type of laser modulation becomes increasingly difficult to implement as the modulation frequency is increased. To increase the laser modulation frequency the lasers have to be driven at high current densities which leads to reduced gain and increased damping from nonlinear effects. These nonlinear effects limit the modulation response of the laser.

Accordingly, light sources that are to be modulated at frequencies above 10 GHz are typically constructed by providing a laser that runs continuously and a separate light modulator that modulates the intensity of the laser output. The modulator typically has a transmissive state and an opaque state, which are switched back and forth by applying a potential across the modulator.

Modulators constructed from an electroabsorptive material are known to the art. These devices utilize a long waveguide having a p-i-n diode section whose transmission depends on the voltage placed across the device. While devices of this type can be modulated at frequencies in excess of 40 GHz, the voltage that must be applied across the device that is greater than 90 $\mu$m long to achieve this modulation frequency is in excess of 2–3 volts. Switching such large voltages at the frequencies in question presents problems that significantly increase the cost of such devices. In principle, a longer device can be utilized to provide the same on/off switching intensity at a lower voltage; however, there is a limit to the physical size of the device. The modulator has a capacitance that depends on its size. As the size is increased, the capacitance increases. At very high frequencies, the RC time constant associated with charging this capacitance limits the modulation response.

SUMMARY OF THE INVENTION

The present invention includes a modulator having a waveguide coupled to a resonator. In general, the resonator may be any type of traveling wave resonator such as a microdisk or a folded cavity resonator. The waveguide has an input port for receiving light of wavelength $\lambda$ and an output port for transmitting modulated light. The resonator has a resonance at wavelength $\lambda$ and is coupled to the waveguide between the input and output ports such that at least 10 percent of the light traveling in the waveguide is coupled to the resonator. The resonator includes a material having a first state and a second state. In the first state, the resonator is "critically coupled" to the waveguide. In the second state, the waveguide is non-critically coupled to the waveguide. The first and second states are selectable by a signal that is applied to the resonator. At "critical coupling" the loss in the resonator exactly matches the amount of power coupled into the resonator resulting in a complete cancellation of the transmitted power past the resonator. The resonator material can use differential absorption or changes in the index of refraction to provide the two states.

In one embodiment, the waveguide and the resonator occupy different portions of a layered structure having an n-type semiconductor layer, an active region that includes an absorbing layer which may be a bulk layer or a multiple quantum well layer, and a p-type semiconductor layer. The active region absorbs light of wavelength $\lambda$ more strongly in the first state than in the second state. The active region in the portion of the layered structure occupied by the waveguide is disordered, thereby rendering the active region in that portion more transparent to light of wavelength $\lambda$ than the active layer in the portion of the layered structure occupied by the microdisk resonator when the microdisk resonator is in the first state. In another embodiment, the active region refractive index changes with the applied signal causing a change in the resonant wavelength of the resonator.

DETAILED DESCRIPTION OF THE PREFERRED EMBODIMENTS OF THE INVENTION

Figures 1, 2:
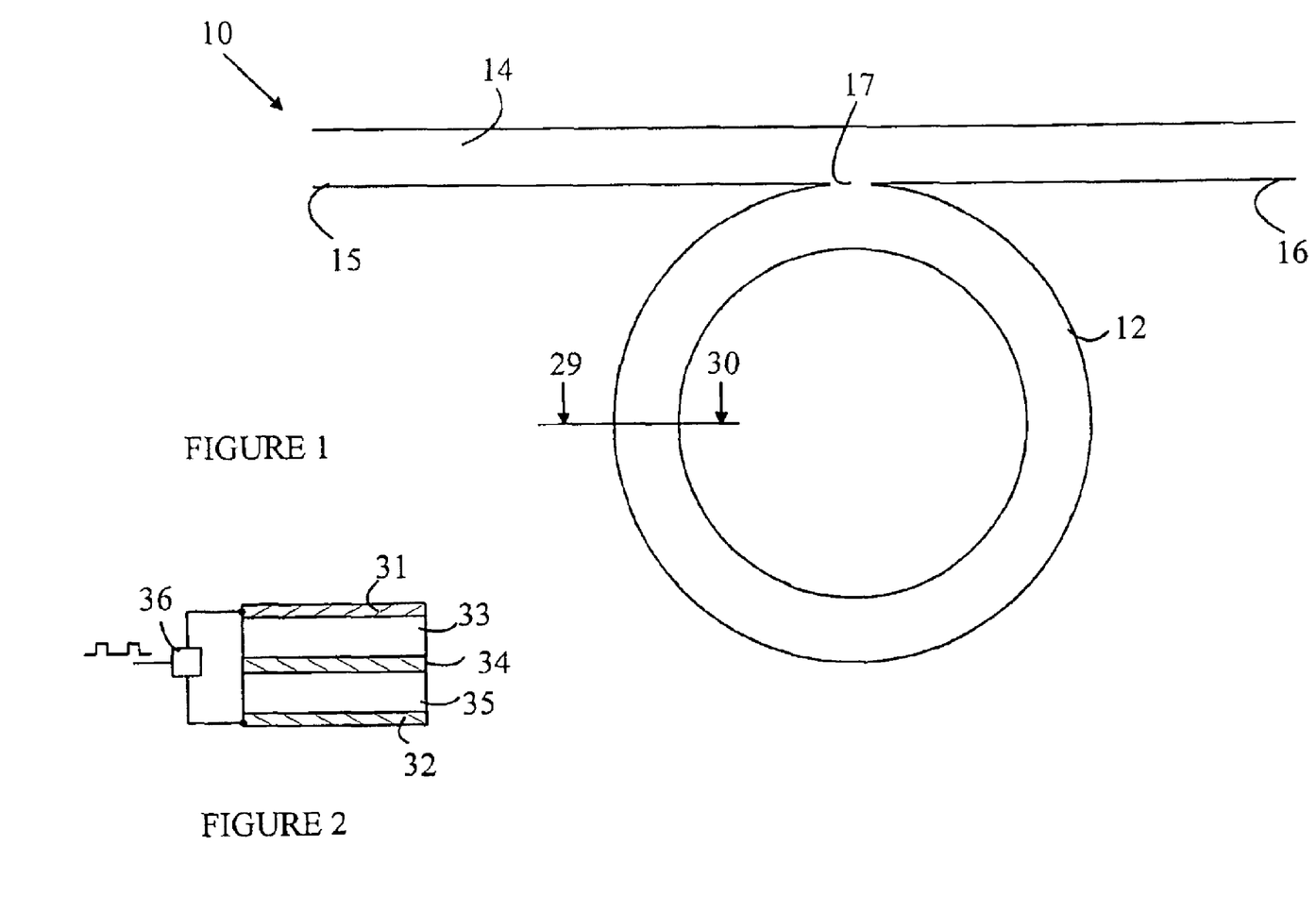
FIG. 1 is a top schematic drawing of a modulator 10.
FIG. 2 is a cross-sectional view of a portion of microdisk resonator 12 shown in FIG. 1.

The manner in which the present invention operates may be more easily understood with reference to FIGS. 1 and 2. FIG. 1 is a top schematic drawing of a modulator 10 constructed from a microdisk resonator 12 and a waveguide 13. Waveguide 13 has an input end 15 and an output end 16. FIG. 2 is a cross-sectional view of a portion of microdisk resonator 12 through line 29–30. Consider coherent light 14 propagating from input end 15 of waveguide 13. Denote the wavelength of the light signal by $\lambda$. Microdisk resonator 12 is positioned relative to waveguide 13 such that some fraction of light 14 is transferred to microdisk resonator 12. This light excites the resonant optical mode within the microdisk resonator. If the losses in the resonator are sufficiently low, the light intensity builds up with each round trip pass of the light around the microdisk. A portion of the light in the resonator is coupled back into the input waveguide at 180 degrees out of phase. The transmission at the output end 16 of the input waveguide is reduced with each round trip pass while the power within the resonator increases.

Figure 3:
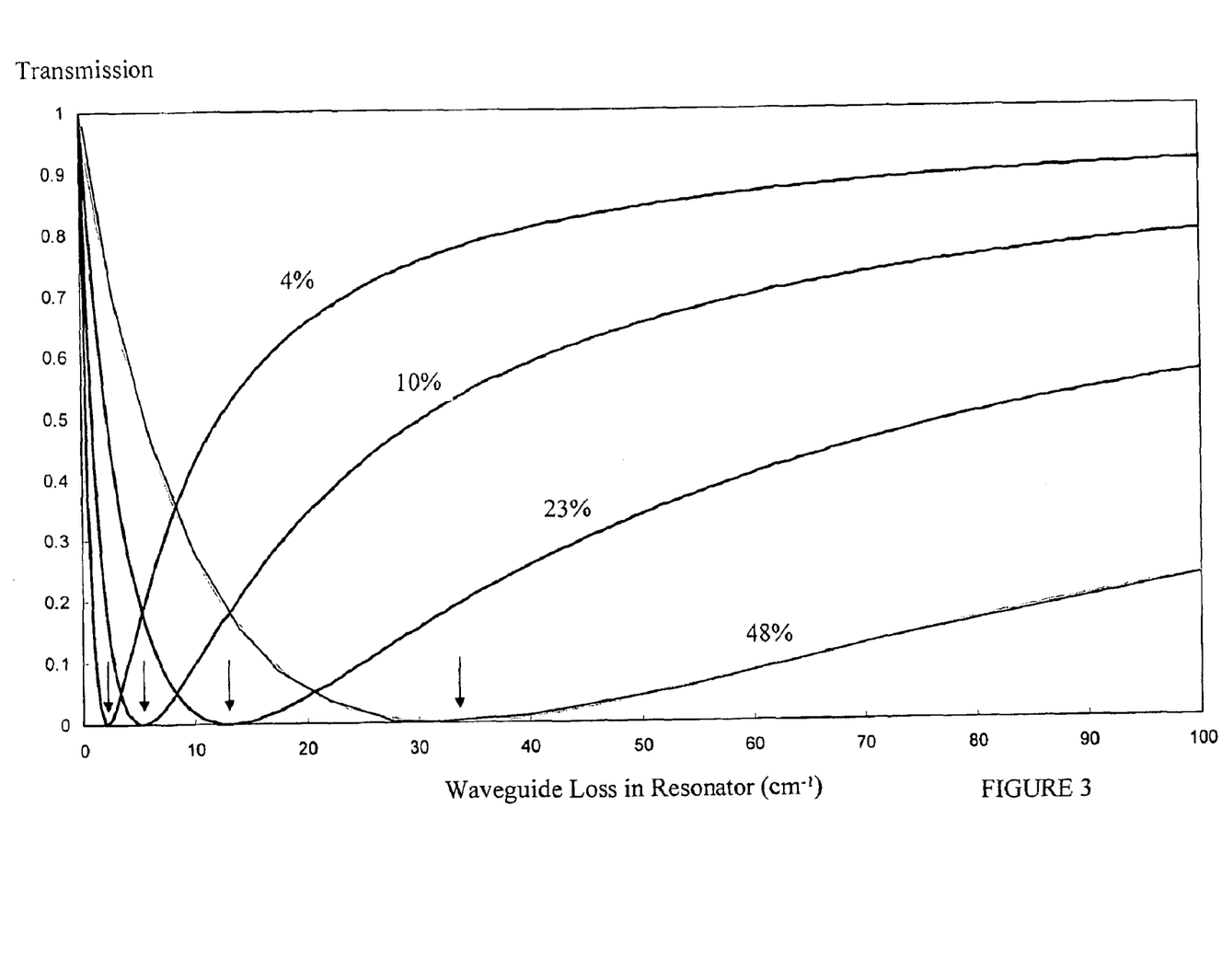
FIG. 3 illustrates the transmission of the modulator as a function of the losses in the modulator for different coupling factors.

The transmission past the resonator depends on two parameters, the power coupling factor into the resonator, and the losses inside the resonator. The losses in the resonator result from the absorption of the light by the material from which the resonator is constructed, scattering light lost at the bends in the waveguide, and light lost due to the change in absorption induced by altering the potential across the resonator. Refer now to FIG. 3, which is a graph of the transmission past a single ring resonator for a number of different coupling factors between 4% and 48%. The arrows mark the critically coupled condition for each coupling factor. At critical coupling, the transmission past the microdisk is zero.

The voltage that is applied to the resonator controls the resonator loss. From FIG. 3 it can be seen that the voltage necessary to achieve a certain modulation depth can be dramatically reduced by operating the modulator around the critically coupled operating point. At low coupling factors, the resonator has a higher Q and a sharper transmission curve, resulting in a large transmission change for a small change in the wavelength loss factor.

The intensity of light in the resonator 12 depends on the quality factor or Q of resonator 12. In general, the total Q may be expressed as, $$\frac{1}{Q_{total}} = \frac{1}{Q_{ext}} + \frac{1}{Q_{int}}$$

where, $Q_{ext}$ is associated with the external power coupling into the resonator and $Q_{int}$ is associated with the losses in the resonator. $Q_{ext}$ is given by:

$$Q_{ext} = \frac{2\pi^2 R n_{eff}}{\lambda \kappa^2}$$

where $n_{eff}$ is the effective index of the microdisk mode, R is the disk radius and $\kappa$ is the power coupling factor. The larger the resonator, the higher the Q. Similarly, for a given radius disk R, the quality factor increases with reduced power coupling. A steady state power level at the output waveguide 16 and inside the resonator will be reached after a time $\tau \sim \omega_0/Q_{total}$ where $\omega_0$ is the angular frequency of the light in radians.

If microdisk resonator 12 is constructed in the manner discussed below, the absorption loss at $\lambda$ can be controlled by switching the potential across electrodes 31 and 32 on the top and bottom surfaces of microdisk resonator 12 between the first and second values. The first value is chosen such that the absorption loss is sufficient to prevent the steady state signal in resonator 12 from increasing to a level at which a significant amount of light cancellation occurs at location 17; hence setting the light output level at location 16 to a high value. The second potential is chosen such that the intensity of light in resonator 12 reaches a value that will just result in the cancellation of light signal 14 resulting in a reduction in the light output at 16. Hence, by switching the potential between these two values, light 14 can be modulated.

Electro-optical absorbers are known in the optical arts, and hence, will not be discussed in detail here. For the purposes of the present discussion, it is sufficient to note that these devices have a structure that is similar to that of an edge emitting laser diode. Referring to FIG. 2, the absorber includes an active region 34 that includes one or more strained quantum well layers separated by barrier layers. The active layer is sandwiched between a p-doped region 33 and an n-doped region 35. Regions 33 and 35 are typically constructed from a number of layers including optical confinement layers.

The absorber is based on the observation that the quantum well structures will absorb light below a cutoff wavelength whose value depends on the potential across the quantum well layers. The position of the cutoff wavelength is determined by the composition and thickness of the quantum well layers. In the region of the cutoff wavelength, the absorption changes continuously as a function of the potential across the active region. Hence, small changes in this potential significantly alter the absorption at $\lambda$.

The magnitude of the switching potential needed to modulate the light depends on the Q of the microdisk resonator. At very high Q values, the amplitude of the switching signal that is applied by signal generator 36 is small, since a very small increase in the absorption of the microdisk resonator will extinguish the resonance. As the Q decreases, the magnitude of the switching potential must be increased. Since the cost of utilizing a high switching voltage at high frequencies is significant, prior art devices that utilize microdisk resonators for switches and modulators have utilized microdisk resonators with very high Q values.

Unfortunately, modulators utilizing such high Q value microdisk resonators tend to be impractical in commercial applications. The high Q value limits the transmission bandwidth of the modulator to a very narrow wavelength $\Delta\lambda = \lambda/Q$. The microdisk resonator must be at resonance to extinguish the input light signal. The resonant wavelength of the microdisk resonator is determined by the dimensions of the microdisk resonator and by the index of refraction of the material through which the light propagates within the microdisk resonator.

High Q resonators are also more sensitive to temperature fluctuations. The index of refraction of the resonator material varies with temperature for most materials. Accordingly, the resonance wavelength varies with temperature. Hence, these devices can only operate correctly over a very narrow temperature range.

The present invention is based on the observation that the amount of drift in the resonance wavelength that can be tolerated also depends on the Q of the microdisk resonator. Modulators utilizing low Q microdisk resonators can tolerate a greater degree of drift, since the band of wavelengths for which the microdisk resonator is in resonance is inversely related to the Q value. Accordingly, the present invention utilizes a resonator that has a Q value less than 6000. In contrast, prior art modulators and switches have focused on microdisk resonators with Q values greater than 6000.

It should be noted that the Q of the microdisk resonator can be controlled by setting the distance between microdisk resonator 12 and waveguide 13. This distance also determines the fraction of the light traversing waveguide 13 that is coupled into microdisk resonator 12. If the distance between microdisk resonator 12 and waveguide 13 is increased, the Q of microdisk resonator 12 is increased and the fraction of the light coupled to microdisk resonator 12 is decreased. In the present invention, microdisk resonator 12 preferably intersects waveguide 13. That is, the distance between microdisk resonator 12 and waveguide 13 is substantially equal to zero. In this case, the fraction of the light transferred to microdisk resonator 12 is greater than 10%.

In one embodiment of the present invention the microdisk resonator and waveguide are constructed from InP-based materials. For the purposes of this discussion, any material that is lattice matched to InP within 1.5 percent will be deemed to be an InP-based material. For example, InGaAsP, AlInAs, AlInGaAs, InGaP, InGaAs, AlGaAsSb, AlAsSb are examples of such materials.

Figure 4:
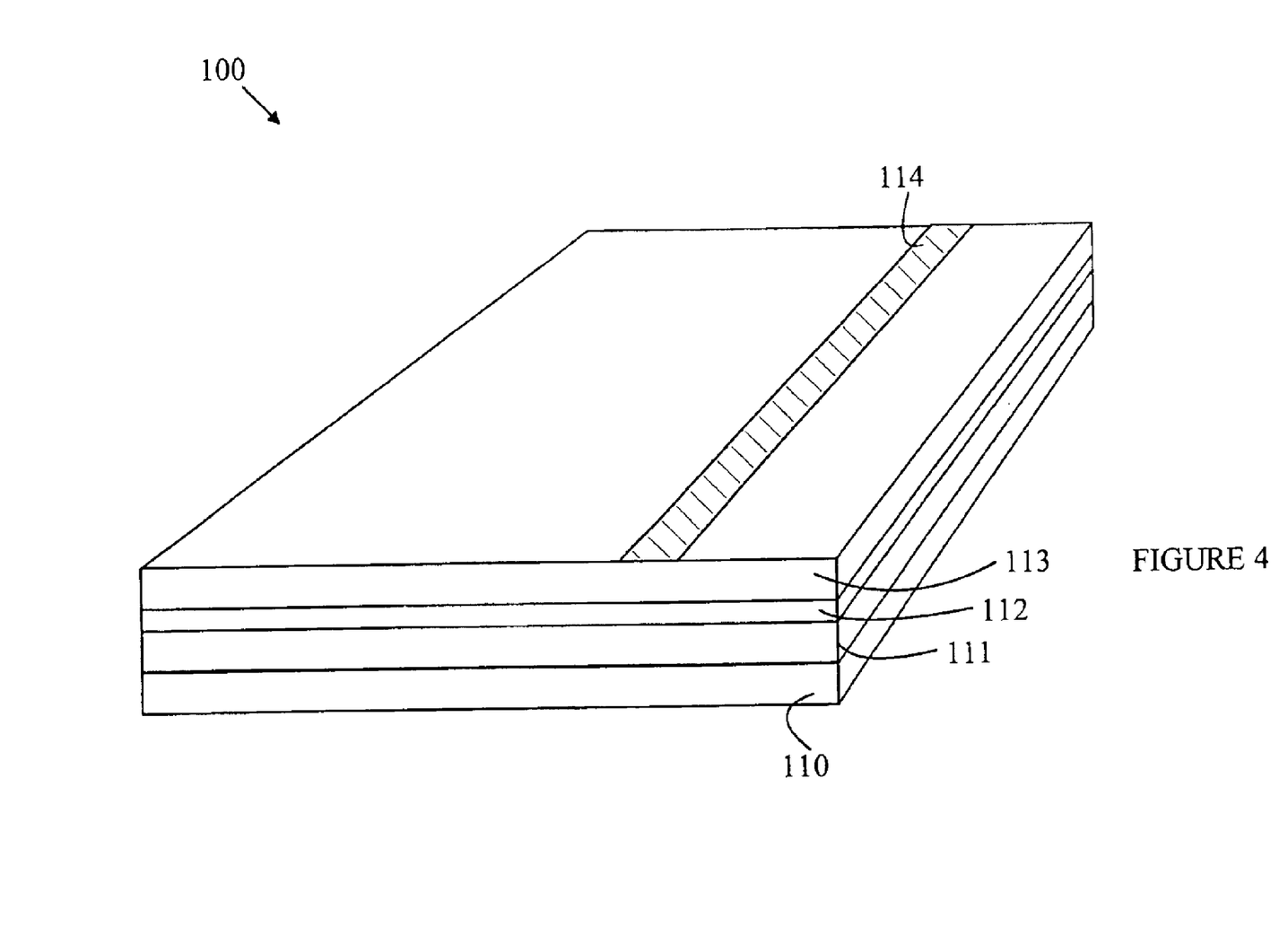
FIGS. 4–6 illustrate a microdisk resonator modulator 100 at various stages in the fabrication process.
Figure 5:
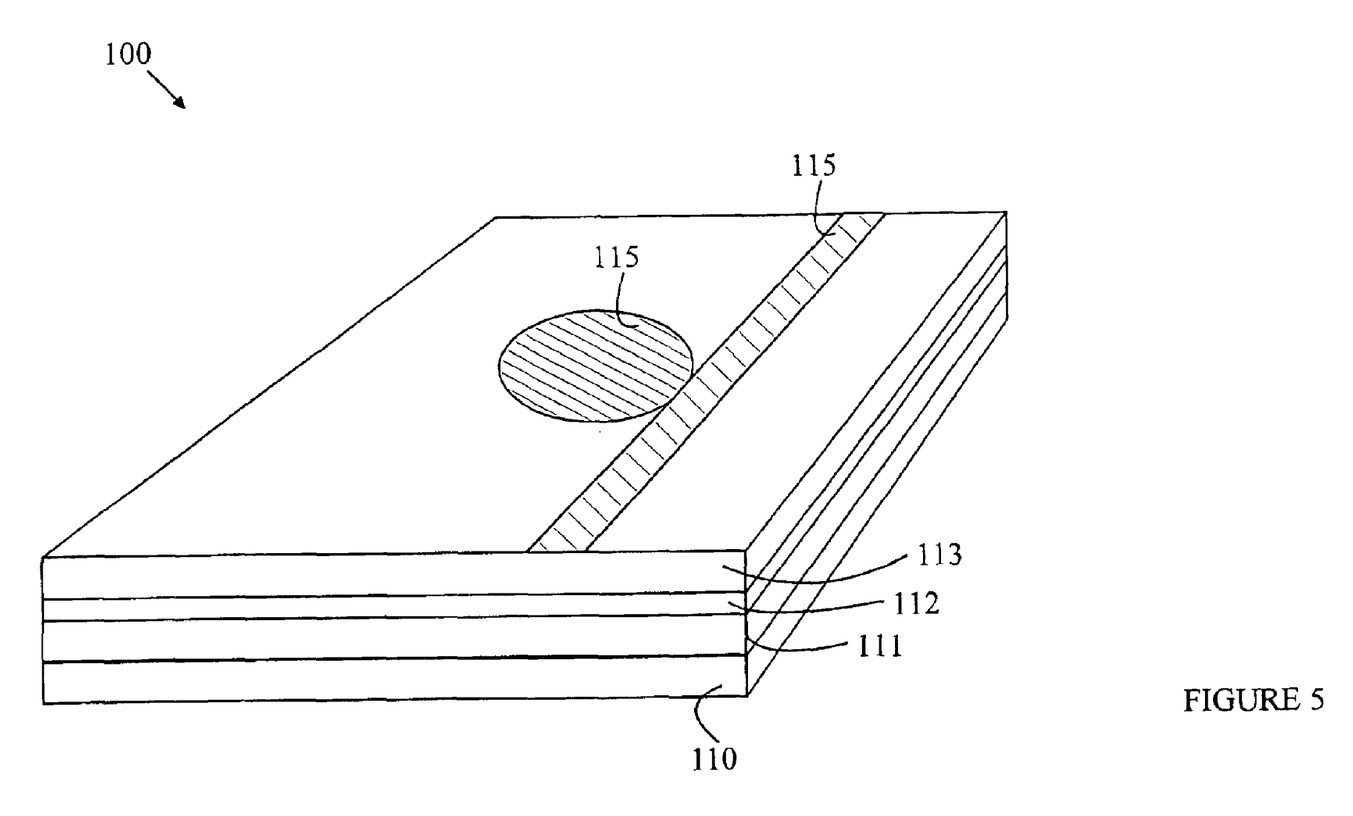
Figure 6:
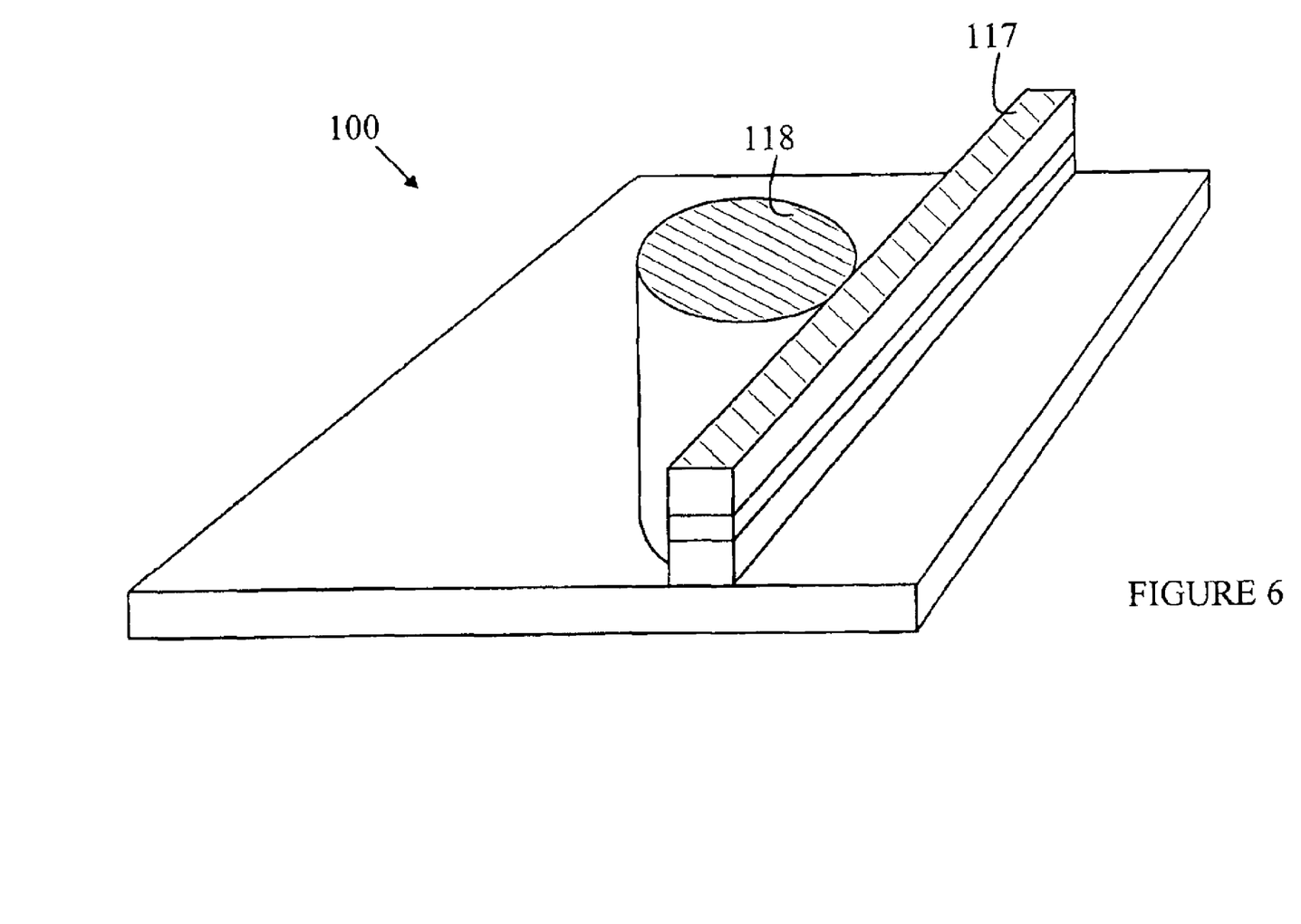

The preferred method for fabricating a modulator according to one embodiment of the present invention will now be discussed with reference to FIGS. 4–6, which illustrate a microdisk resonator modulator 100 at various stages in the fabrication process. Refer now to FIG. 4, which is a perspective view of a microdisk resonator modulator 100 after the layers used to construct the waveguide and the microdisk resonator have been deposited. The various layers are deposited on a substrate 110. To simplify the drawings, the conventional n-contact layer is included in the substrate 110. An n-InP cladding layer 111, an active layer 112, and a p-InP cladding layer 113 are deposited on the substrate in the conventional manner.

A $SiO_2$ film 114 is sputtered on cladding layer 113 in the region that will become the waveguide. The quantum well layer(s) in the active region under film 114 are then disordered to render the active layer in this region transparent to light of the wavelength that will be modulated in the device. The disordering can be accomplished by high temperature annealing utilizing impurity-induced disordering or vacancy-induced disordering. Since these techniques are known to the art, they will not be discussed in detail here. It is sufficient to note that the disordering alters the bandgaps in the quantum well layers. If the quantum well layers were left intact and had the same composition as those in the microdisk resonator region, the waveguide would absorb the light. Other methods of rendering the quantum well layers transparent to the desired wavelength may also be utilized. Some of these include, selective area growth, phosphorus implantation followed with thermal annealing.

The dielectric mask used to disorder the waveguide region is then removed, and the top electrode contact for the microdisk resonator is deposited. To simplify the drawings, the electrode layer has not been shown in the drawings. The microdisk resonator and waveguide regions are then masked as shown at 115 in FIG. 5. The unmasked areas are then etched leaving the waveguide 117 and microdisk resonator 118 as shown in FIG. 6. The etch depth is chosen so that for the particular waveguide width only a single transverse mode is supported.

While the exemplary embodiment discussed above utilizes a final etch that extends to the substrate, it will be appreciated that other levels of etching can be utilized. In general, the etched region in the vicinity of the microdisk resonator needs to extend at least through the active region. A shallower etch can be utilized in the region of the waveguide.

The above-described embodiments of the present invention require the creation of sub-micron features. To minimize bend losses, the microdisk resonator requires a large change in the index of refraction between the boundary of the resonator and the surrounding medium. This is accomplished by etching the area around the resonator and waveguide as described above. Unfortunately, this forces the width of the waveguide to be less than 0.5 $\mu$m. If the waveguide was wider than this, the waveguide would support multiple modes. While such structures are within the range of current manufacturing techniques, the cost of the submicron fabrication substantially increases the cost of the modulator. In addition, coupling into these narrow high index contrast waveguides from external optical fibers is difficult due to the different mode sizes. As a result, the coupling loss into the modulator increases.

Figure 7:
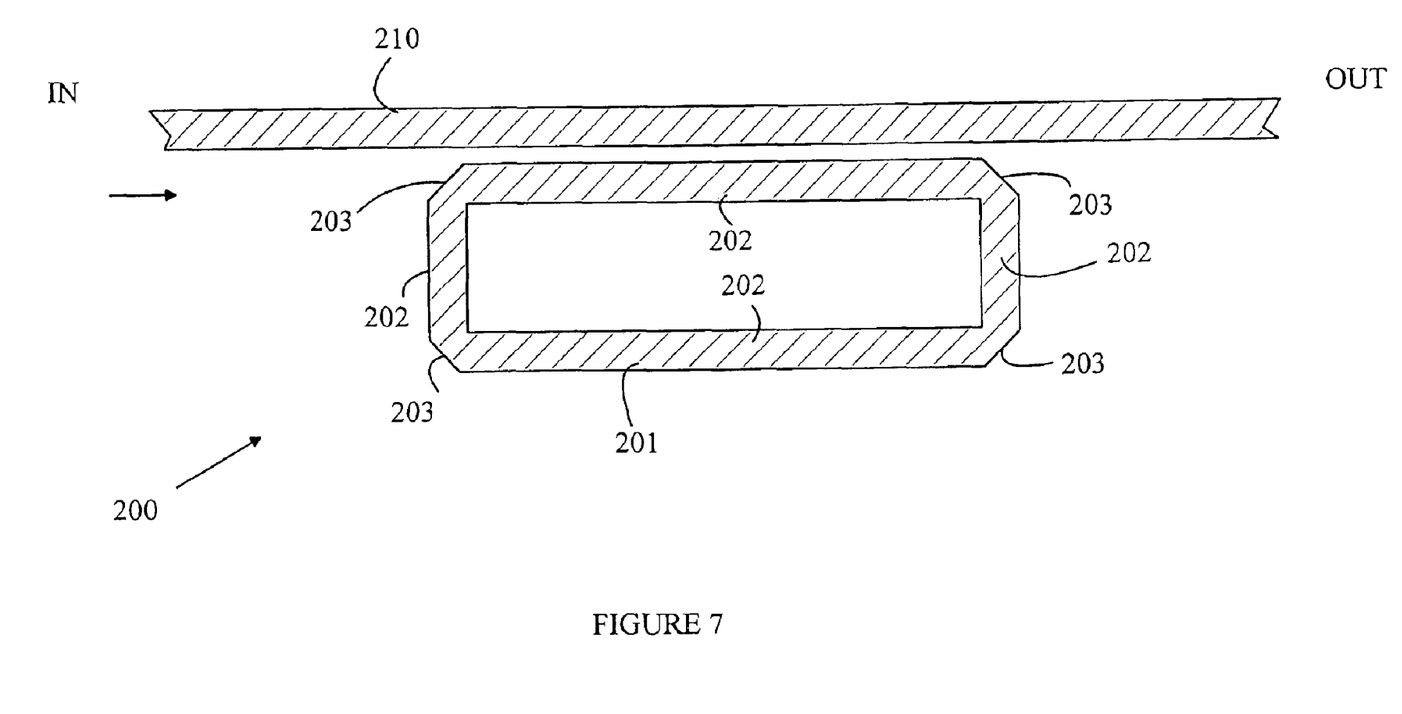
FIG. 7 is a top view of a modulator using a folded cavity resonator.

Embodiments in which submicron structures are avoided can be constructed by using folded cavity resonators that do not require a large difference in index of refraction. Refer now to FIG. 7, which is a simplified top view of an embodiment of a modulator 200 according to another embodiment of the present invention. Modulator 200 utilizes a folded cavity resonator 201 coupled to a waveguide 210. Resonator 201 is constructed from straight waveguides 202 and 90 degree turning mirrors 203. The advantage of this configuration is that low index contrast waveguides may now be utilized, and hence, the maximum waveguide width that will be limited to one mode is much larger. Typically, the waveguide widths are on the order of 1–2 $\mu$m for waveguides constructed from Group III–V materials.

Figure 8:
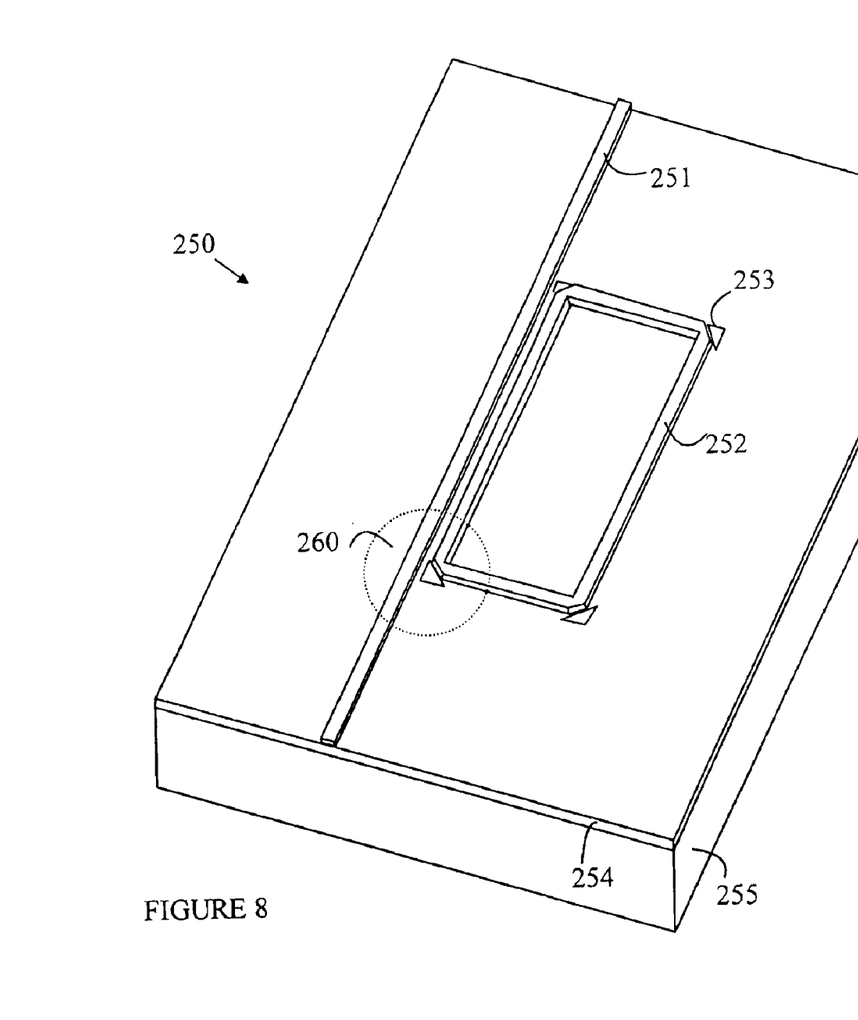
FIG. 8 is a prospective view of a folded cavity resonator 250 according to one embodiment of the present invention.
Figure 9:
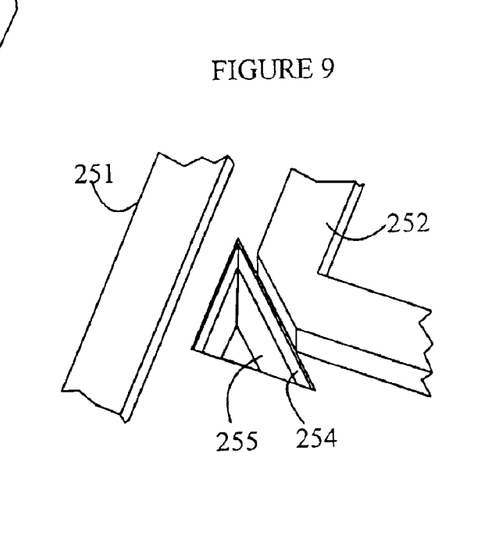
FIG. 9 is a magnified portion of the region of FIG. 8 shown at 260.

Refer now to FIGS. 8 and 9. FIG. 8 is a prospective view of a folded cavity resonator 250 according to one embodiment of the present invention. FIG. 9 is a magnified portion of the region of FIG. 8 shown at 260. Modulator 260 is constructed by fabricating the active layer 254 and cladding layers on top of a substrate 255, which includes the lower cladding layer. These layers are deposited in a manner analogous to that discussed above. The region of the active region that is to become waveguide 210 shown in FIG. 7 is disordered in a manner analogous to that discussed above. A silicon dioxide layer is deposited on top of these layers. The silicon dioxide layer is then patterned to define the ridge waveguide 251 which is formed by etching into the top cladding layer. A similar ridge waveguide 252 is patterned over the region that is to become the folded mirror resonator. The mirrors in the folded mirror resonator are then created by etching holes from the surface of the layered structure through the active region 254 and into substrate 255. The surface of this hole provides a boundary having a large change in index of refraction that acts as a turning mirror with a high reflection coefficient, for example, a reflection coefficient greater than 0.9. After formation of the ridge waveguides and turning mirrors, metal electrodes are placed on top of the folded resonator to allow change in the absorption of the active layer through the application of a voltage.

The above-described embodiments of the present invention have utilized a resonator in which the absorption of the light in the resonator is altered by changing a potential applied across the resonator. However, other mechanisms for altering the state of the resonator can be utilized. For example, the resonator can include a material whose index of refraction changes with the potential difference across the material. This allows the resonance wavelength to be shifted between two states. To block the light, the index is shifted such that the resonator's resonance is exactly matched to the wavelength of the light being modulated. To place the modulator in the transmissive mode, the resonator's resonance wavelength is shifted to a value that is different from that of the light signal.

Various modifications to the present invention will become apparent to those skilled in the art from the foregoing description and accompanying drawings. Accordingly, the present invention is to be limited solely by the scope of the following claims.

What is claimed is:

1. A modulator comprising:
   a waveguide having an input port for receiving light of wavelength $\lambda$ and an output port for transmitting modulated light; and
   a resonator having a resonance at wavelength $\lambda$, said resonator being coupled to said waveguide between said input and output ports such that at least 10 percent of said light traveling in said waveguide is coupled to said resonator, said resonator comprising a material having a first state and a second state, said resonator being critically coupled to said waveguide in said first state and said resonator being non-critically coupled to said waveguide in said second state, said first and second states being selectable by a signal that is applied to said resonator.

2. The modulator of claim 1 wherein said material absorbs light of wavelength $\lambda$ and wherein said absorption depends on said state.

3. The modulator of claim 1 wherein said material has a first index of refraction in said first state and a second index of refraction in said second state, said first index of refraction being different from said second index of refraction.

4. The modulator of claim 1 wherein said resonator comprises a microdisk resonator.

5. The modulator of claim 1 wherein said resonator comprises a folded cavity resonator.

6. The modulator of claim 1 wherein said waveguide and said resonator occupy different portions of a layered structure comprising an n-type semiconductor layer, an active region comprising a quantum well layer, and a p-type semiconductor layer, said active region absorbing light of wavelength $\lambda$ more strongly in said first state than in said second state, wherein said active region in said portion of said layered structure occupied by said waveguide is disordered, thereby rendering said active region in that portion more transparent to light of wavelength $\lambda$ than said active layer of said layered structure occupied by said resonator when said resonator is in said first state.

7. The modulator of claim 1 wherein said waveguide and said resonator comprise InP-based materials.

8. The modulator of claim 1 wherein said resonator has a Q of less than 6000.

* * * * *